Oct. 11, 1927.

A. MÜLLER 1,644,847

DIRECTION INDICATOR FOR VEHICLES

Filed Feb. 24, 1926    2 Sheets-Sheet 1

Oct. 11, 1927.
A. MÜLLER
1,644,847
DIRECTION INDICATOR FOR VEHICLES
Filed Feb. 24, 1926    2 Sheets-Sheet 2
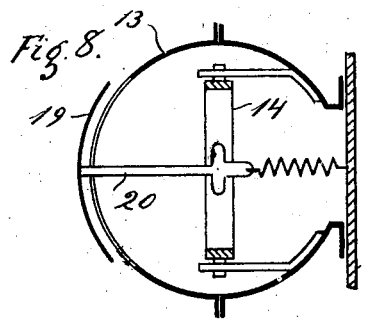
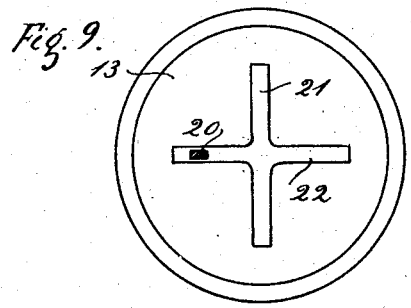
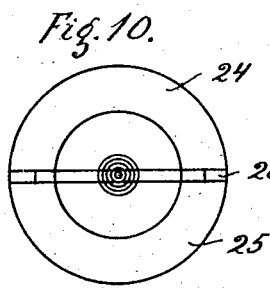
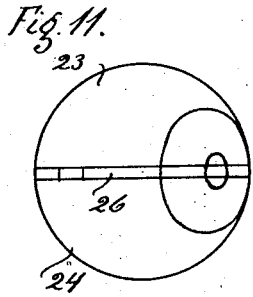
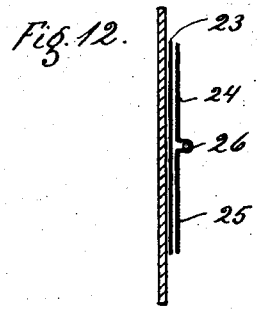
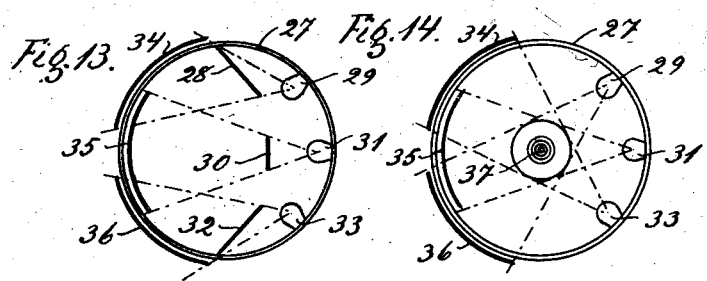
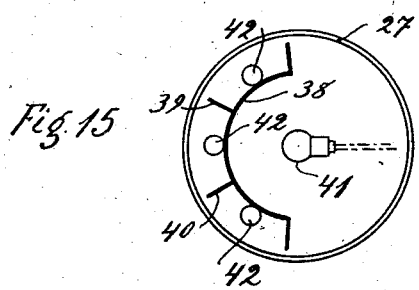

Patented Oct. 11, 1927.

1,644,847

UNITED STATES PATENT OFFICE.

AUGUST MÜLLER, OF NUREMBERG, GERMANY, ASSIGNOR OF ONE-HALF TO KARL SCHIEDER, OF NUREMBERG, GERMANY, A FIRM.

DIRECTION INDICATOR FOR VEHICLES.

Application filed February 24, 1926, Serial No. 90,433, and in Germany September 22, 1925.

The direction-indicators for vehicles designed to indicate at long distance the intended alteration of the direction of travel, in order to regulate the traffic and to avoid accidents, consist usually of an arrow which is adjusted in such a manner that it points, according to the circumstances, to the right or to the left or stands in vertical direction. Indicators of this type fulfill their object in an imperfect manner only. The sign is not distinct enough so that it is sometimes difficult to see in which direction the arrow points. The direction indicators of known type do further not indicate whether a vehicle at rest intends to start or whether a running vehicle intends to stop.

This invention relates to a direction indicator having indicating elements indicating the intended direction of travel of a vehicle in such a manner that everyone can see at once in which direction the vehicle intends to veer. This is obtained by making each indicator represent an eye which looks in the direction in which the vehicle intends to veer. The vehicle looks like a living being the intention of which can be read from the eyes. The intention to stop or to start can be easily indicated by the improved direction-indicator by turning the eyes down or up. The improved direction indicator presents further the advantage that one can see in which direction of travel the vehicle intends to run, even if one looks at the vehicle from the side, this being not possible with the commonly used direction-indicators.

An embodiment of the invention is shown, by way of example, in the accompanying drawings, in which:—

Figs. 8 and 9 show in vertical section and in front elevation respectively a form of construction in which the body of the pupil is mounted in front of the sphere which represents the eyeball.

Figs. 10 and 11 show in front elevation a direction indicator in which the pictures of the eyes are represented on plane surfaces.

Fig. 12 is a vertical section of Fig. 10.

Fig. 13 shows a direction-indicator in which the image of a pupil body is projected onto several points of a hollow sphere of opaque glass forming the eyeball.

Figs. 14 and 15 are similar views as Fig. 13, the construction being slightly modified.

Figure 1:
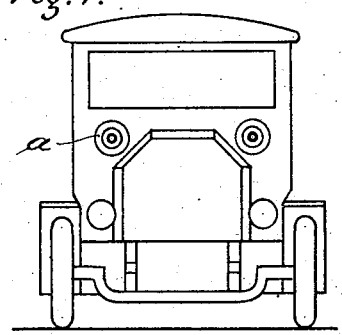
Figs. 1, 2 and 3 show a motor car in front elevation, the direction-indicator being shown in each figure in another position.
Figure 2:
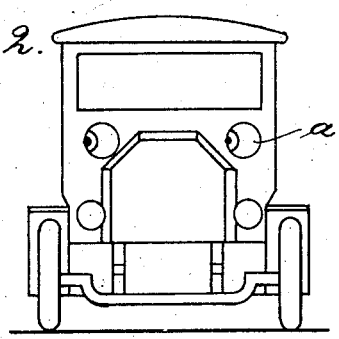

In the direction-indicator, shown in Fig. 1, the eyes $a$ indicating the direction are in the central position. The vehicle runs straight ahead. Fig. 2 shows the eyes turned to the right and indicating that the vehicle intends to veer to the right.

Figure 3:
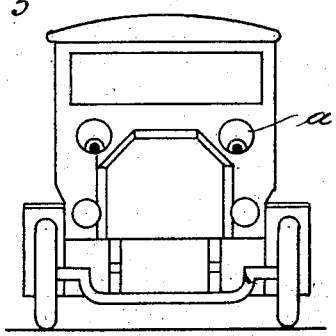
Figure 4:
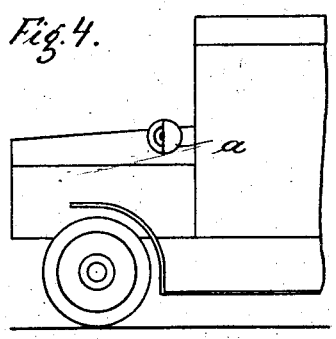
Fig. 4 shows a motor car in side elevation, the direction-indicator being turned to the left, to indicate, that the motor car intends to veer to the left.

Fig. 3 shows the eyes turned down to indicate that the vehicle intends to stop. In a similar manner the upwardly turned eyes could indicate for instance that a stopping vehicle intends to start.

The eyes indicating the direction of travel may be constructed in various manners. Different eyes might be used as direction-indicators for day or night. The eyes may however be constructed so that they may be used at day as at night.

Figure 5:
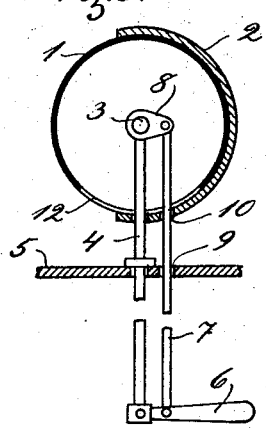
Fig. 5 shows a direction indicator according to the invention adapted to be operated by hand.

The direction-indicator shown in Fig. 5 is adapted to be operated by hand. The hollow sphere 1, representing the eye, is adjustably mounted in a stationary semisphere 2, so that it can be turned in any direction. The sphere 1 is carried by a horizontal axle 3 journalled in the head of a vertical rod 4. This rod 4 traverses a slot 12 in the hollow sphere 1 said slot extending from forward to backward. The rod 4 rests rotatably on a supporting plate 5. A hand lever 6 is hingedly connected with the lower end of rod 4. To the hand lever 6 a rod 7 is hingedly connected which extends through arc-shaped slots 9 and 10 of the supporting plate 5 and semisphere 2 and is connected with an arm 8 rigid on the axle 3. If the hand lever 6 is turned to the side, the sphere 1 turns sidewards to the right or to the left, the rod 7 moving in the slots 9 and 10. If the lever 6 is raised or lowered the sphere 1 rotates in the vertical plane, the edges of slot 12 sliding along rod 4.

The hollow sphere 1 may be made of metal or of other known transparent material, a pupil and iris being painted on the same. In this case the direction-indicator must be lighted from the outside for use at night. The front portion of the direction-indicator may however be made from opaque glass painted accordingly. In this case the direction-indicator is lighted by an incandescent electric lamp arranged in the hollow sphere, the electric current being supplied to said lamp by the rod 4.

Instead of a hollow sphere adjustable in the stationary semisphere a solid hollow sphere may be used behind which or in front of which the imitation of a pupil and an iris is adjustable. Or plane disks may be used on each of which an eye looking straight ahead, an eye looking to the left and an eye looking to the right are painted so that if the disk is rotated one of said eyes becomes visible.

Figure 6:
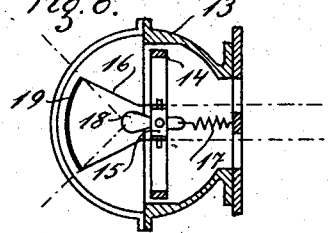
Figs. 6 and 7 show in horizontal and vertical section respectively an arrangement in which pupil and iris are movable in a transparent stationary hollow sphere.
Figure 7:
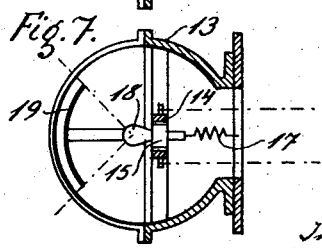

Figs. 6 and 7 show by way of example a form of construction of the direction-indicator in which the pupil and the iris are movably mounted in a transparent stationary hollow sphere. In this hollow sphere 13, the front part of which is transparent, a frame 14 is rotatably mounted on a horizontal axle. In this frame 14 a block 15 is rotatably mounted on which, by means of arms 16, a body 19 representing a pupil is fixed. Between the arms 16 an incandescent lamp 18 is fixed on the block 15 which projects the shadow of the body of the pupil upon the front wall of the hollow sphere said front wall consisting preferably of opaque glass. If the body 19 is adjusted into another position, the incandescent lamp participates in this movement. The adjusting may be effected in any convenient manner, for instance, by pull strings, indicated in dash-and-dot line, introduced from behind into the hollow sphere, or by electro-magnets. On the rear side of the block 15 a spring 17 is arranged which has the tendency to return the pupil body into the central position.

Figs. 8 and 9 show a form of construction of the direction-indicator in which the pupil body 19 is arranged in front of the sphere 13 which represents the eyeball. The pupil body 19 is fixed on an arm 20, projecting through slots 21 and 22 of the hollow sphere, said slots crossing one another. The arm 20 is fixed in the frame 14 similar to that described with reference to Figs. 6 and 7, so that the arm can be adjusted in the slots in horizontal and vertical directions.

Figs. 10 to 12 illustrate a direction-indicator in which the pictures of the eyes are represented on plane surfaces. In front of a circular disc 23 two semicircular discs 24 and 25 are arranged by means of a hinge 26 so that they can be folded the one over the other in downward or in upward direction. According to the position of the flaps or discs 24 and 25 three different circular surfaces become visible on each of which a picture of an eye is painted. If the flaps are in the position shown in Fig. 12, the eye looking straight ahead is visible as shown in Fig. 10. If the flap 24 is turned down the eye looking to the left, as shown in Fig. 11, is visible and if the flap 25 is raised an eye appears which looks to the right. At night the discs are lighted from the front.

In the direction-indicators, shown in Figs. 13 to 15, the picture of a pupil body is projected upon different points of a hollow sphere 27 of opaque glass representing the eyeball.

In the form of construction, shown in Fig. 13 the transparent plates 28, 30 and 32 on each of which a picture of an eye is painted, are arranged in the hollow sphere 27, three incandescent electric lamps 29, 31 and 33 being also arranged in said sphere, one for each plate. According to whether the one or the other of the three incandescent lamps is switched in, the pictures of the eyes appear at different points on the surface of the hollow sphere. The position of the pictures is indicated by the arcs 34, 35 and 36. The pupil discs 28, 30 and 32 are arranged so that the discs, corresponding to the lamps which are not lighted, do not project any shadow on the front surface of the hollow sphere if the lamp is lighted. Evidently a fourth or fifth lamp can be arranged above and below the central lamp 31.

In the form of construction shown in Fig. 14 only one pupil body 37 is arranged at the centre of the hollow sphere 27 and designed to project onto this hollow sphere the pictures 34, 35 and 36 if one of the lamps 29, 31 or 33 is lighted.

In the direction-indicator, shown in Fig. 15, a picture-carrier 38 is arranged in the hollow sphere 27 concentrically to the same, on which carrier three pictures of an eye are painted the one at the side of the other and separated the one from the other by partitions 39 and 40. At the centre of the hollow sphere an incandescent lamp 41 is arranged which is permanently lighted. On the outer side of each eye picture an incandescent electric lamp 42 is arranged, two of which are lighted at the same time so that the eye-pictures are not visible from the outer side. Only that picture is visible the lamp 42 of which is not lighted. The appearing of the pictures is therefore dependent of the extinguishing of the corresponding lamp.

I claim:—

1. A direction-indicator for vehicles in which the indicating element simulates an eye and comprising a hollow sphere of transparent material simulating an eyeball, a cone with spherical base simulating the pupil and the iris adjustably mounted in said hollow sphere, and means for adjusting said cone into different positions.

2. A direction-indicator for vehicles in which the indicating element simulates an eye and comprising plane discs on which eyes are painted, means for covering all but one of said discs, and means for operating said discs.

3. A direction-indicator for vehicles in which the indicating element simulates an eye and comprising a hollow sphere of opaque glass, transparent pictures representing a pupil and iris fixed in said hollow sphere, and electric incandescent lamps for selectively projecting any single one of said eye pictures onto different points of said hollow sphere.

In testimony whereof I affix my signature.

AUGUST MÜLLER.